(12) United States Patent
Yang

(10) Patent No.: US 11,820,427 B2
(45) Date of Patent: Nov. 21, 2023

(54) LANE KEEPING ASSIST SYSTEM OF VEHICLE AND LANE KEEPING METHOD USING THE SAME

(71) Applicant: HYUNDAI MOBIS CO., LTD., Seoul (KR)

(72) Inventor: Jin Ho Yang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 357 days.

(21) Appl. No.: 17/381,638

(22) Filed: Jul. 21, 2021

(65) Prior Publication Data

US 2022/0024518 A1 Jan. 27, 2022

(30) Foreign Application Priority Data

Jul. 24, 2020 (KR) .......................... 10-2020-0092459

(51) Int. Cl.
| | |
|---|---|
| G06V 20/58 | (2022.01) |
| B62D 15/02 | (2006.01) |
| B60W 30/12 | (2020.01) |
| G06V 20/56 | (2022.01) |
| G06N 3/08 | (2023.01) |
| G06N 3/044 | (2023.01) |
| G06N 3/045 | (2023.01) |

(52) U.S. Cl.
CPC ....... *B62D 15/025* (2013.01); *B62D 15/0255* (2013.01); *B62D 15/0265* (2013.01); *G06N 3/044* (2023.01); *G06N 3/045* (2023.01); *G06N 3/08* (2013.01); *G06V 20/588* (2022.01)

(58) Field of Classification Search
CPC .............. B62D 15/025; B62D 15/0255; B62D 15/0265; G06V 20/588; B60W 30/12; B60Y 2300/12
USPC ...................................................... 701/42, 44
See application file for complete search history.

(56) References Cited

U.S. PATENT DOCUMENTS

| | | | |
|---|---|---|---|
| 11,335,085 B2* | 5/2022 | We ......................... | G06V 10/98 |
| 11,699,282 B1* | 7/2023 | Saggu .................. | G06V 20/588 382/104 |
| 2019/0272446 A1* | 9/2019 | Kangaspunta ..... | G01C 21/3859 |

(Continued)

OTHER PUBLICATIONS

Yang, et al. "Lane Position Detection Based on Long Short-Term Memory (LSTM)." *Sensors* vol. 20 Issue 11 (2020): pp. 1-19.

(Continued)

*Primary Examiner* — Erick R Solis
(74) *Attorney, Agent, or Firm* — NSIP Law

(57) ABSTRACT

A lane keeping assist system includes: a camera configured to provide an image around a vehicle as image information; a lane information generator configured to generate image reliability information and first lane information, based on the image information; an image storage configured to store the image information for each predetermined time among predetermined times; a neural network learning device configured to generate second lane information based on the image reliability information and the image information stored for each predetermined time; and a steering controller configured to select either one of the first lane information and the second lane information as lane information, based on the image reliability information, and generate steering information based on the selected lane information.

13 Claims, 2 Drawing Sheets

(56) References Cited

U.S. PATENT DOCUMENTS

| | | | |
|---|---|---|---|
| 2021/0365696 A1* | 11/2021 | He ................... | B60W 50/14 |
| 2022/0266855 A1* | 8/2022 | He ................... | B60W 40/09 |
| 2023/0034574 A1* | 2/2023 | Xie ................... | G01C 21/26 |
| 2023/0099494 A1* | 3/2023 | Kocamaz ............ | G06N 3/0464 |
| | | | 382/103 |
| 2023/0103020 A1* | 3/2023 | Rohlfs ................ | B60W 30/12 |
| | | | 701/23 |
| 2023/0148097 A1* | 5/2023 | Miyake ............... | G01S 13/867 |
| | | | 348/148 |
| 2023/0242145 A1* | 8/2023 | Tsuchiya ............. | G06V 20/56 |
| | | | 701/23 |
| 2023/0245429 A1* | 8/2023 | He ................... | G06V 10/774 |
| | | | 382/100 |

OTHER PUBLICATIONS

Extended European Search Report dated Dec. 15, 2021 in counterpart European Patent Application No. 21186877.3. (7 pages in English).

* cited by examiner

LANE KEEPING ASSIST SYSTEM OF VEHICLE AND LANE KEEPING METHOD USING THE SAME

CROSS-REFERENCE TO RELATED APPLICATIONS

This application claims the benefit under 35 U.S.C. § 119(a) of Korean Patent Application No. 10-2020-0092459 filed on Jul. 24, 2020 in the Korean Intellectual Property Office, the entire disclosure of which is incorporated herein by reference for all purposes.

TECHNICAL FIELD

The present disclosure relates to a lane keeping assist system of a vehicle and a lane keeping method using the same.

BACKGROUND

An advanced driver assistance system (ADAS) is a system for allowing a driver to more conveniently and safely drive by providing a risk alert or by means of active intervention using obtained driving information.

The ADAS is a navigation-based smart cruise control (NSCC), a smart cruise control (SCC), a lane departure warning system (LDWS), a lane keeping assist system (LKAS), a forward collision avoidance assist system (FCAS), a driver status monitoring system (DSMS), or the like.

The LKAS which is the ADAS is a device for allowing the vehicle to keep the lane itself and travel, which is configured generally such that the vehicle follows the center between the lane to travel based on image information obtained by means of a camera.

However, the LKAS has a difference in performance of detecting lane depending on weather, illumination, a road surface, and the like upon traveling, because of using the camera.

Particularly, when lane information is temporarily inaccurately recognized due to an intersection or a section of road construction, pollution of the road surface, and the like, the lane keeping function of the LKAS may be released.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lane keeping assist system includes: a camera configured to provide an image around a vehicle as image information; a lane information generator configured to generate image reliability information and first lane information, based on the image information; an image storage configured to store the image information for each predetermined time among predetermined times; a neural network learning device configured to generate second lane information based on the image reliability information and the image information stored for each predetermined time; and a steering controller configured to select either one of the first lane information and the second lane information as lane information, based on the image reliability information, and generate steering information based on the selected lane information.

The lane information generator may be further configured to generate a degree to which it is able to detect a lane from an image included in the image information as the image reliability information, and generate position information between the vehicle and the lane, a curvature of the lane, and information about an angle difference between a vehicle driving direction and a lane direction as the first lane information, based on the image information.

The neural network learning device may be further configured to be activated in response to it being determined that the image information is unreliable based on the image reliability information, and further configured to be deactivated in response to it being determined that the image information is reliable based on the image reliability information.

The neural network learning device may be further configured to generate the second lane information based on the image information stored for each predetermined time, in response to the neural network learning device being activated.

The neural network learning device may be further configured to: convert the image information stored for each predetermined time into data; extract data patterns necessary for lane detection; learn the data patterns to generate a learning model; predict position information between the vehicle and the lane, a curvature of the lane, and information about an angle difference between a vehicle driving direction and a lane direction, based on the learning model; and output the predicted position information, the curvature of the lane, and the information about the angle difference, as the second lane information.

The steering controller may be further configured to: generate the steering information based on the first lane information, in response to it being determined that the image information is reliable based on the image reliability information; and generate the steering information based on the second lane information, in response to it being determined that the image information is unreliable based on the image reliability information.

In another general aspect, a lane keeping assist system includes: an image storage configured to store image information obtained from a camera for each predetermined time among predetermined times; a neural network learning device configured to convert the image information stored for each predetermined time into data, extract and learn a data pattern necessary for lane detection, predict position information between a vehicle and a lane, a curvature of the lane, and information about an angle difference between a vehicle driving direction and a lane direction, based on the learned result, and output the predicted information as lane information; and a steering controller configured to generate steering information based on the lane information, in response to it being determined that the image information is unreliable based on image reliability information obtained by determining reliability of the image information.

The neural network learning device may include: a plurality of convolution neural networks (CNNs) configured to convert each of pieces of the image information stored for each predetermined time into data, extract the data pattern, and learn the data pattern to generate a learning model; and a long short term memory (LSTM) configured to predict the lane information through time series learning based on the learning model.

The steering controller may be further configured to: generate the steering information based on the lane information, in response to it being determined that the image information is unreliable based on the image reliability information; and generate the steering information based on the image information obtained from the camera, in response to it being determined that the image information is reliable based on the image reliability information.

In another general aspect, a lane keeping method includes: obtaining an image from a camera; generating first lane information based on the obtained image; storing the obtained image for each predetermined time among predetermined times; determining reliability of the obtained image; datatizing the image stored for each determined time and learning the converted image into data, to predict and generate second lane information; and selecting either one of the first lane information and the second lane information as lane information, based on the determined reliability of the image, and generating steering information based on the selected lane information.

The predicting and generating of the second lane information may include: datatizing and learning the image obtained from the camera using a convolution neural network (CNN) specialized in image learning; and predicting the second lane information from a result of the learning of the image obtained from the camera using the CNN, by using a long short term memory (LSTM) specialized in time series data learning.

The generating of the steering information may include: generating the steering information based on the first lane information, in response to it being determined that the image obtained from the camera is reliable based on the determined reliability of the image; and generating the steering information based on the second lane information, in response to it being determined that the image obtained from the camera is unreliable based on the determined reliability of the image.

In another general aspect, a non-transitory computer-readable storage medium stores instructions that, when executed by a processor, cause the processor to perform the lane keeping method described above.

Other features and aspects will be apparent from the following detailed description, the drawings, and the claims.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
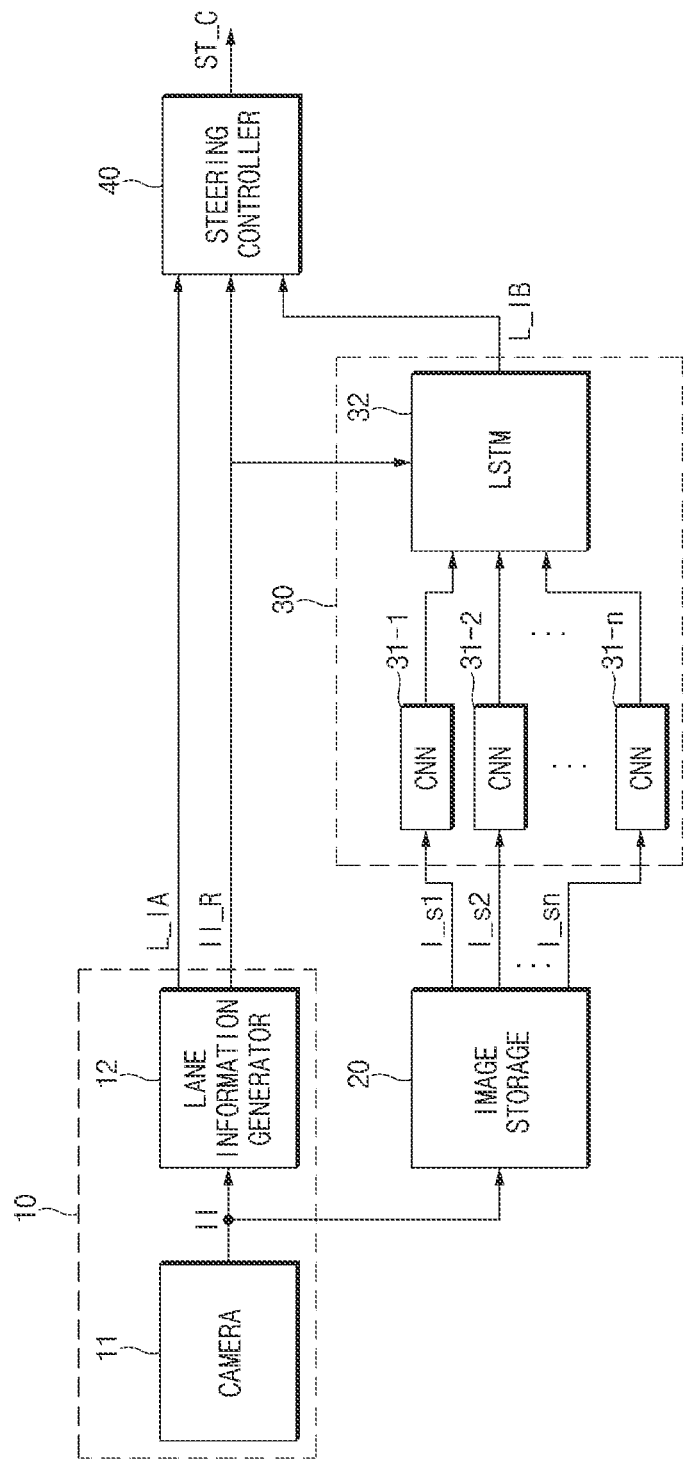
FIG. 1 is a block diagram illustrating a configuration of a lane keeping assist system according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 and 2.

FIG. 1 is a block diagram illustrating a configuration of a lane keeping assist system according to an embodiment of the present disclosure.

Referring to FIG. 1, a sensor module 10, an image storage 20, a neural network learning device 30, and a steering controller 40 according to an embodiment of the present disclosure may be implemented in a vehicle. In this case, each of the sensor module 10, the image storage 20, the neural network learning device 30, and the steering controller 40 may be integrally configured with control units in the vehicle or may be implemented as a separate device to be connected with the control units of the vehicle by a separate connection means.

The sensor module 10 may include various sensors used in an advanced driver assistance system (ADAS), which may convert sensing information provided from the sensors into data and may provide the control units in the vehicle with the converted information into data.

In this case, the sensor module 10 according to an embodiment of the present disclosure may include a camera 11 and a lane information generator 12.

The camera 11 may obtain an image around the vehicle to provide image information II.

The lane information generator 12 may generate first lane information L_IA for controlling a driving direction of the vehicle based on the image information provided from the camera 11 and may provide the steering controller 40 with the first lane information L_IA.

For example, the lane information generator 12 may detect a lane included in an image based on the image information II and may generate information for steering control of the vehicle based on a form of the detected lane, thus providing the steering controller 40 with the generated information as the first lane information L_IA.

Furthermore, the lane information generator 12 may detect the lane included in the image based on the image information II and may generate reliability information according to the detected result, thus providing the steering controller 40 with the generated reliability information as image reliability information II_R.

For example, the lane information generator 12 may determine how well it detects the lane from the image based on the image information II and may provide the steering controller 40 with the determined result as the image reliability information II_R.

In detail, when it is impossible to detect the lane from the image based on the image information II, the lane information generator 12 may generate image reliability information II_R indicating that the image information II is unreliable and may provide the steering controller 40 with the image reliability information II_R.

The image storage 20 may store the image information II provided from the camera 11.

For example, the image storage 20 may store the image information II provided from the camera 11 for each predetermined time.

In this case, the image storage 20 may simultaneously store the image information II and information about a time when the image information II is stored.

Furthermore, the image storage 20 may classify pieces of the image information II stored for each predetermined time in an order where they are stored and may provide the neural network learning device 30 with the classified pieces of image information II as a plurality of pieces of storage image information I_s1 to I_sn.

The neural network learning device 30 may receive the image reliability information II_R from the lane information generator 12, may receive the plurality of pieces of storage image information I_s1 to I_sn from the image storage 20 to generate second lane information L_IB, and may provide the steering controller 40 with the generated second lane information L_IB.

In this case, the neural network learning device 30 may be activated or deactivated based on the image reliability information II_R.

For example, the neural network learning device 30 may be activated when the reliability level of the image reliability information II_R is lower than a predetermined reliability level. The activated neural network learning device 30 may generate the second lane information L_IB based on the plurality of storage image information I_s1 to I_sn.

In this case, when the reliability level of the image reliability information II_R is lower than the predetermined reliability level, the image reliability information II_R may refer to including the result of determining that it is impossible for the lane information generator 12 to detect the lane from the image based on the image information II.

Meanwhile, the neural network learning device 30 may be deactivated when the reliability level of the image reliability information II_R is higher than the predetermined reliability level. The deactivated neural network learning device 30 may stop generating the second lane information L_IB based on the plurality of storage image information I_s1 to I_sn.

When activated, the neural network learning device 30 of the lane keeping assist system according to an embodiment of the present disclosure may learn the plurality of storage image information I_s1 to I_sn, using convolution neural networks (CNNs) 31-1 to 31-*n* specialized in image learning and a long short term memory (LSTM) 32 specialized in time series data learning, and may generate the second lane information L_IB based on the learned result.

Thus, the neural network learning device 30 may include the plurality of CNNs 31-1 to 31-*n* for respectively receiving and learning the plurality of pieces of storage image information I_s1 to I_sn and the LSTM 32 for receiving and learning the learned results from the plurality of CNNs 31-1 to 31-*n*.

As described above, the neural network learning device 30 of the lane keeping assist system according to an embodiment of the present disclosure may be activated or deactivated based on the image reliability information II_R.

At least one of the plurality of CNNs 31-1 to 31-*n* and the LSTM 32 included in the neural network learning device 30 may be activated or deactivated based on the image reliability information II_R.

It is shown and described that the LSTM 32 included in the neural network learning device 30 of the lane keeping assist system according to an embodiment of the present disclosure is activated or deactivated according to the image reliability information II_R. However, it is obvious that the plurality of CNNs 31-1 to 31-*n* may be activated or deactivated according to the image reliability information II_R and all of the plurality of CNNs 31-1 to 31-*n* and the LSTM 32 may be activated or deactivated according to the image reliability information II_R.

Each of the plurality of CNNs 31-1 to 31-*n* may convert the storage image information I_s1 to I_sn respectively provided thereto into data, may extract data patterns necessary for lane detection, and may learn the extracted data patterns to generate a learning model.

Because the plurality of storage image information I_s1 to I_sn include images stored for each predetermined time, the plurality of storage image information I_s1 to I_sn may include lane images from the past to the present.

Thus, the plurality of CNNs 31-1 to 31-*n* may generate a learning model for lanes from the past to the present based on the plurality of pieces of storage image information I_s1 to I_sn and may provide the LSTM 32 with the learning model.

The LSTM 32 may be activated or deactivated based on the image reliability information II_R.

For example, when the reliability level of the image reliability information II_R is lower than the predetermined reliability level, the LSTM 32 may be activated.

Meanwhile, when the reliability level of the image reliability information II_R is higher than the predetermined reliability level, the LSTM 32 may be deactivated.

In this case, when the reliability level of the image reliability information II_R is lower than the predetermined reliability level, the image reliability information II_R may refer to including the result of determining that it is impossible for the lane information generator 12 to detect the lane from the image based on the image information II.

The activated LSTM 32 may receive a learning model for the lanes from the past to the present as time series data, may learn the learning model to generate a prediction model of the lane, may generate information for steering control of the vehicle based on a form of the lane according to the prediction model of the lane, and may provide the steering controller 40 with the generated information as the second lane information L_IB.

The steering controller 40 may receive the first lane information L_IA and the image reliability information II_R from the lane information generator 12 and may receive the second lane information L_IB from the neural network learning device 30, thus generating steering information ST_C.

For example, the steering controller 40 may select one of the first lane information L_IA and the second lane information L_IB based on the image reliability information II_R and may generate the steering information ST_C based on the selected lane information.

In this case, the steering information ST_C may include a steering angle for determining a driving direction of the vehicle.

In detail, when the reliability level of the image reliability information II_R is higher than the predetermined reliability level, the steering controller 40 may generate the steering information ST_C based on the first lane information L_IA.

Meanwhile, when the reliability level of the image reliability information II_R is lower than the predetermined reliability level, the steering controller 40 may generate the steering information ST_C based on the second lane information L_IB.

In this case, when the reliability level of the image reliability information II_R is lower than the predetermined reliability level, the image reliability information II_R may refer to including the result of determining that it is impossible for the lane information generator 12 to detect the lane from the image based on the image information II.

Furthermore, when the reliability level of the image reliability information II_R is higher than the predetermined reliability level, the image reliability information II_R may include the result of determining that it is possible for the lane information generator 12 to detect the lane from the image based on the image information II.

A description will be given of an example of a process where the steering controller 40 generates the steering information ST_C including a steering angle based on one selected between the first lane information L_IB and the second lane information L_IB.

The lane keeping assist system according to an embodiment of the present disclosure may approximate the image obtained from the camera to a tertiary function of performing curve fitting of a form of the lane using an image processing technique, may calculate a steering angle necessary for lane keeping per control period using a coefficient and a constant term of the obtained function, and may provide a steering device (not shown) with the calculated steering angle as the steering information ST_C, such that the vehicle may follow the lane to travel.

In this case, the steering controller 40 may include an algorithm for the tertiary function of performing curve fitting of the lane form. Receiving the image obtained from the camera 11, the lane information generator 12 and the LSTM 32 may provide the steering controller 40 with information corresponding to the coefficient and the constant term of the tertiary function as the first lane information L_IA and the second lane information L_IB.

As a result, the lane information generator 12 and the LSTM 32 may generate position information between the vehicle and the lane, a curvature of the lane, and information about an angle difference between a vehicle driving direction and a lane direction based on the image obtained from the camera 11 and may convert the generated information to correspond to the coefficient and the constant term of the tertiary function to generate the first lane information L_IA and the second lane information L_IB.

Figure 2:
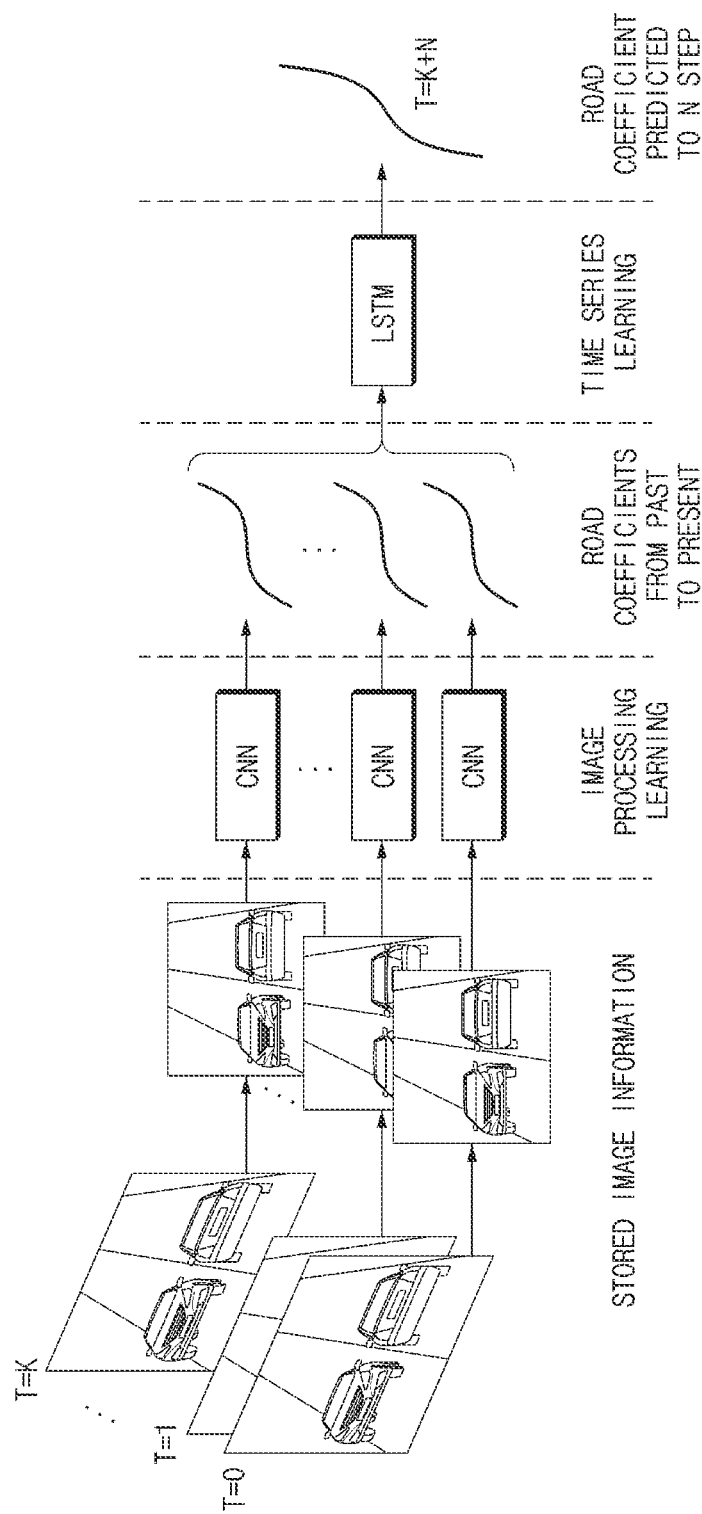
FIG. 2 is a drawing illustrating an operation of a lane keeping assist system according to an embodiment of the present disclosure.

FIG. 2 is a drawing illustrating an operation of a lane keeping assist system according to an embodiment of the present disclosure.

FIG. 2 is a drawing illustrating an operation of a neural network learning device 30 included in a lane keeping assist system according to an embodiment of the present disclosure.

As described above, the neural network learning device 30 may include a plurality of CNNs 31-1 to 31-*n* and an LSTM 32.

Image information II including an image obtained from a camera 11 of FIG. 1 may be stored in an image storage 20 for each predetermined time T.

Thus, the image storage 20 may store road image as the image information II for each predetermined time T (=0 to K) and may provide the corresponding CNN with stored images I_s1 to I_sn for each time.

Thus, the plurality of CNNs 31-1 to 31-*n* may receive road images from the past (T=0) to the present (T=k) as the storage image information I_s1 to I_sn, may convert (e.g., image processing) the storage image information I_s1 to I_sn into data, may extract data patterns necessary for lane detection, and may learn the extracted data patterns.

In this case, the data patterns necessary for the lane detection may be obtained by datatizing a road coefficient, that is, a form of the lane.

As a result, the plurality of CNNs 31-1 to 31-*n* may provide the LSTM 32 with the road coefficients (e.g., lane forms) from the past to the present.

The LSTM 32 may receive the road coefficients from the past to the present as time series data from the plurality of CNNs 31-1 to 31-*n* and may learn the road coefficients to predict a road coefficient in the future (N step).

The LSTM 32 may provide the steering controller 40 with the predicted road coefficient as second lane information L_IB of FIG. 1.

In this case, like first lane information L_IA of FIG. 1, the second lane information L_IB may include pieces of information for calculating a steering angle at a steering controller 40 of FIG. 1.

A description will be given of an operation of the lane keeping assist system according to an embodiment of the present disclosure, which has the above configuration.

An image of the road on which the vehicle is traveling may be provided from a camera 11 of FIG. 1 to a lane information generator 12 and an image storage 20 of FIG. 1.

The lane information generator 12 may generate position information between the vehicle and the lane based on image information II of FIG. 1, a curvature of the lane, and information about an angle difference between a vehicle driving direction and a lane direction and may provide the steering controller 40 with the generated information as the first lane information L_IA.

In this case, the lane information generator 12 may generate a degree to which it is able to detect a lane from an image included in the image information II as image reliability information II_R and may provide a neural network learning device 30 and a steering controller 40 of FIG. 1 with the image reliability information II_R.

The image storage 20 may store the image information II for each predetermined time and may provide the neural network learning device 30 with the image information II stored for each time as pieces of storage image information I_s1 to I_sn.

It may be determined whether the neural network learning device 30 is activated based on the image reliability information II_R.

The activated neural network learning device 30 may convert the image information II stored for each time, that is, the storage image information I_s1 to I_sn from the past to the present into data, may extract a data pattern capable of detecting a lane, and may learn the extracted data pattern.

Furthermore, the activated neural network learning device 30 may predict position information between the vehicle and the lane, a curvature of the lane, and information about an angle difference between a vehicle driving direction and a lane direction based on the data patterns learned from the past to the present and may provide the steering controller 40 with the predicted information as the second lane information L_IB.

In this case, the neural network learning device 30 may activated when receiving the image reliability information indicating that the image information II obtained from the camera 11 is unreliable and may be deactivated when receiving the image reliability information II_R indicating that the image information II is reliable.

When receiving the image reliability information II_R indicating that the image information II is reliable, the steering controller 40 may generate steering information ST_C based on the first lane information L_IA.

When receiving the image reliability information II_R indicating that the image information II is unreliable, the steering controller 40 may generate steering information ST_C based on the second lane information L_IB.

Thus, the lane keeping assist system according to an embodiment of the present disclosure may determine reliability of a current image obtained from the camera 11, may generate steering information ST_C depending on the current image obtained from the camera 11, when it is determined that the current image is reliable, and may determine a driving direction of the vehicle based on the steering information ST_C, such that the vehicle may follows the lane to travel.

Furthermore, the lane keeping assist system according to an embodiment of the present disclosure may determine the reliability of the current image obtained from the camera 11, may perform neural network learning of images stored from the past to the present to predict a lane, when it is determined that the current image is unreliable, may generate steering information ST-C depending on the predicted lane, and may determine a driving direction of the vehicle based on the steering information ST_C, such that the vehicle may follows the lane to travel.

As a result, the lane keeping assist system according to an embodiment of the present disclosure may allow the vehicle to follow the lane to travel in a situation where the image obtained from the camera 11 is unreliable, thus improving driving stability of the lane keeping assist system and increasing convenience of a driver.

The present technology may maintain a lane keeping function although lane information obtained from the camera is temporarily inaccurately recognized, thus improving stability of the lane keeping assist system and increasing utilization.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A lane keeping assist system, comprising:
a camera configured to provide an image around a vehicle as image information;
a lane information generator configured to generate image reliability information and first lane information, based on the image information;
an image storage configured to store the image information for each predetermined time among predetermined times;
a neural network learning device configured to generate second lane information based on the image reliability information and the image information stored for each predetermined time; and
a steering controller configured to select either one of the first lane information and the second lane information as lane information, based on the image reliability information, and generate steering information based on the selected lane information.

2. The lane keeping assist system of claim 1, wherein the lane information generator is further configured to generate a degree to which it is able to detect a lane from an image included in the image information as the image reliability information, and generate position information between the vehicle and the lane, a curvature of the lane, and information about an angle difference between a vehicle driving direction and a lane direction as the first lane information, based on the image information.

3. The lane keeping assist system of claim 1, wherein the neural network learning device is further configured to be activated in response to it being determined that the image information is unreliable based on the image reliability information, and is further configured to be deactivated in response to it being determined that the image information is reliable based on the image reliability information.

4. The lane keeping assist system of claim 3, wherein the neural network learning device is further configured to generate the second lane information based on the image information stored for each predetermined time, in response to the neural network learning device being activated.

5. The lane keeping assist system of claim 4, wherein the neural network learning device is further configured to:
convert the image information stored for each predetermined time into data;
extract data patterns necessary for lane detection;
learn the data patterns to generate a learning model;
predict position information between the vehicle and the lane, a curvature of the lane, and information about an angle difference between a vehicle driving direction and a lane direction, based on the learning model; and
output the predicted position information, the curvature of the lane, and the information about the angle difference, as the second lane information.

6. The lane keeping assist system of claim 1, wherein the steering controller is further configured to:
generate the steering information based on the first lane information, in response to it being determined that the image information is reliable based on the image reliability information; and
generate the steering information based on the second lane information, in response to it being determined that the image information is unreliable based on the image reliability information.

7. A lane keeping assist system, comprising:
an image storage configured to store image information obtained from a camera for each predetermined time among predetermined times;
a neural network learning device configured to:
convert the image information stored for each predetermined time into data;
extract and learn a data pattern necessary for lane detection;
predict position information between a vehicle and a lane, a curvature of the lane, and information about an angle difference between a vehicle driving direction and a lane direction, based on the learned result; and output the predicted information as lane information; and a steering controller configured to generate steering information based on the lane information, in response to it being determined that the image information is unreliable based on image reliability information obtained by determining reliability of the image information.

8. The lane keeping assist system of claim 7, wherein the neural network learning device includes:

a plurality of convolution neural networks (CNNs) configured to convert each of pieces of the image information stored for each predetermined time into data, extract the data pattern, and learn the data pattern to generate a learning model; and a long short term memory (LSTM) configured to predict the lane information through time series learning based on the learning model.

9. The lane keeping assist system of claim 7, wherein the steering controller is further configured to:

generate the steering information based on the lane information, in response to it being determined that the image information is unreliable based on the image reliability information; and generate the steering information based on the image information obtained from the camera, in response to it being determined that the image information is reliable based on the image reliability information.

10. A lane keeping method, comprising:
obtaining an image from a camera;
generating first lane information based on the obtained image;
storing the obtained image for each predetermined time among predetermined times;
determining reliability of the obtained image;
datatizing the image stored for each determined time and learning the converted image into data, to predict and generate second lane information; and
selecting either one of the first lane information and the second lane information as lane information, based on the determined reliability of the image, and generating steering information based on the selected lane information.

11. The lane keeping method of claim 10, wherein the predicting and generating of the second lane information includes:

datatizing and learning the image obtained from the camera using a convolution neural network (CNN) specialized in image learning; and predicting the second lane information from a result of the learning of the image obtained from the camera using the CNN, by using a long short term memory (LSTM) specialized in time series data learning.

12. The lane keeping method of claim 10, wherein the generating of the steering information includes:

generating the steering information based on the first lane information, in response to it being determined that the image obtained from the camera is reliable based on the determined reliability of the image; and generating the steering information based on the second lane information, in response to it being determined that the image obtained from the camera is unreliable based on the determined reliability of the image.

13. A non-transitory computer-readable storage medium storing instructions that, when executed by a processor, cause the processor to perform the lane keeping method of claim 10.

* * * * *